(12) United States Patent
Goldberg et al.

(10) Patent No.: US 7,191,712 B2
(45) Date of Patent: Mar. 20, 2007

(54) RECEPTACLE COVER DEVICE WITH RAISED WORK SURFACE

(76) Inventors: Steven Lane Goldberg, P.O. Box 676030, Rancho Santa Fe, CA (US) 92067; Phillip Jay Berkovitz, 7767 Corte Promenade, La Costa, CA (US) 92009

( * ) Notice: Subject to any disclaimer, the term of this patent is extended or adjusted under 35 U.S.C. 154(b) by 311 days.

(21) Appl. No.: 10/768,246

(22) Filed: Jan. 30, 2004

(65) Prior Publication Data
US 2004/0182288 A1 Sep. 23, 2004

Related U.S. Application Data

(63) Continuation of application No. 10/154,559, filed on May 23, 2002, now Pat. No. 6,745,702.

(51) Int. Cl.
*A47B 85/00* (2006.01)
(52) U.S. Cl. ............... 108/26; 108/90; 108/24
(58) Field of Classification Search .................. 108/26, 108/90, 24, 25, 11; 248/188.9, 188.8; 100/115; 297/189.08, 188.12, 217.1
See application file for complete search history.

(56) References Cited

U.S. PATENT DOCUMENTS

| | | | |
|---|---|---|---|
| 3,181,483 A | 5/1965 | De Vitt et al. | |
| 3,659,369 A * | 5/1972 | Hermanson | 248/201 |
| 4,041,964 A | 8/1977 | Shamoon | |
| 4,379,587 A | 4/1983 | Duncan | |
| 4,810,031 A * | 3/1989 | Patterson | 297/188.12 |
| 4,846,076 A | 7/1989 | Menges, Sr. et al. | |
| 5,572,934 A | 11/1996 | Aldridge et al. | |
| 5,586,805 A | 12/1996 | Rinehart | |
| 5,592,884 A | 1/1997 | Glick et al. | |
| 5,938,276 A * | 8/1999 | Munoz et al. | 297/188.12 |
| 6,148,737 A | 11/2000 | Bowman et al. | |
| 6,321,662 B1 | 11/2001 | Fraise | |
| 6,745,702 B2 * | 6/2004 | Goldberg et al. | 108/26 |

FOREIGN PATENT DOCUMENTS

FR 2 696 625 A1 4/1994

\* cited by examiner

*Primary Examiner*—Jose V. Chen
(74) *Attorney, Agent, or Firm*—Stephen C. Beuerle; Procopio Cory Hargreaves & Savitch LLP

(57) ABSTRACT

A waste container cover and work surface device, for attachment to a receptacle, comprising: a table defining an upper side and an underside and a frame, the upper side of the table defining a working surface; and a plurality of support members each having a first end and a second end and being attached in endwise manner at the first end to the frame of the table and projecting away from the underside of the table. The waste container cover and work surface device provides a work surface on which to place items such as a cutting board, sheet pan or container; and a support surface, for holding tools, supplies, and the like, while providing convenient access to the waste container below.

15 Claims, 5 Drawing Sheets

RECEPTACLE COVER DEVICE WITH RAISED WORK SURFACE

This is a continuation of U.S. application Ser. No. 10/154,559, filed May 23, 2002, now U.S. Pat. No. 6,745,702.

TECHNICAL FIELD

This invention relates to receptacle cover devices and trash can covers adapted for the support of objects and simultaneous work thereon.

BACKGROUND

It is often the case in many work environments that there is a lack of work surfaces and the trash can ends up with boxes or other items laying on top of the trash can so as to free up additional work surfaces. This action then prevents the use of the trash can for disposal of waste. For example, in an office copy room where there are many boxes of supplies and little counter space for work. Or, for example, in an auto mechanic's garage there is often the need for a nearby waste receptacle and a convenient place for holding tools being used and small parts of the automobile that may have been removed during the process of maintenance of the automobile. In restaurants, there is a need to cut foods and conveniently place the finished food product in containers or on trays. Restaurants often lack adequate work surfaces for such food preparation. There have been a variety of cutting board devices and work tables for food preparation developed for use next to or in conjunction with a sink or trash receptacle with the finished food product placed in a bowl or on a sheet pan, while allowing disposal of waste in the sink or trash receptacle. However, these devices are not intended for use over a receptacle, such as a trash can, nor do they extend the usable work surfaces of the restaurant. There are also a variety of decorative trash can covers, but these devices do not provide additional work space while allowing unhampered access to the interior of the receptacle for waste disposal.

SUMMARY

With the foregoing in mind, one aspect of the present invention relates to a receptacle cover that provides a raised work surface while making it possible to dispose of waste in the receptacle without disturbing objects placed on the device. A second aspect of the present invention is that it increases the usable workspace in a work environment. In general, the present invention is a table-like device with fixed or collapsible legs that are attached to the receptacle. The present invention includes a plurality of attachments, such as trays, cutting boards and containers.

DETAILED DESCRIPTION OF THE INVENTION

Figure 1:
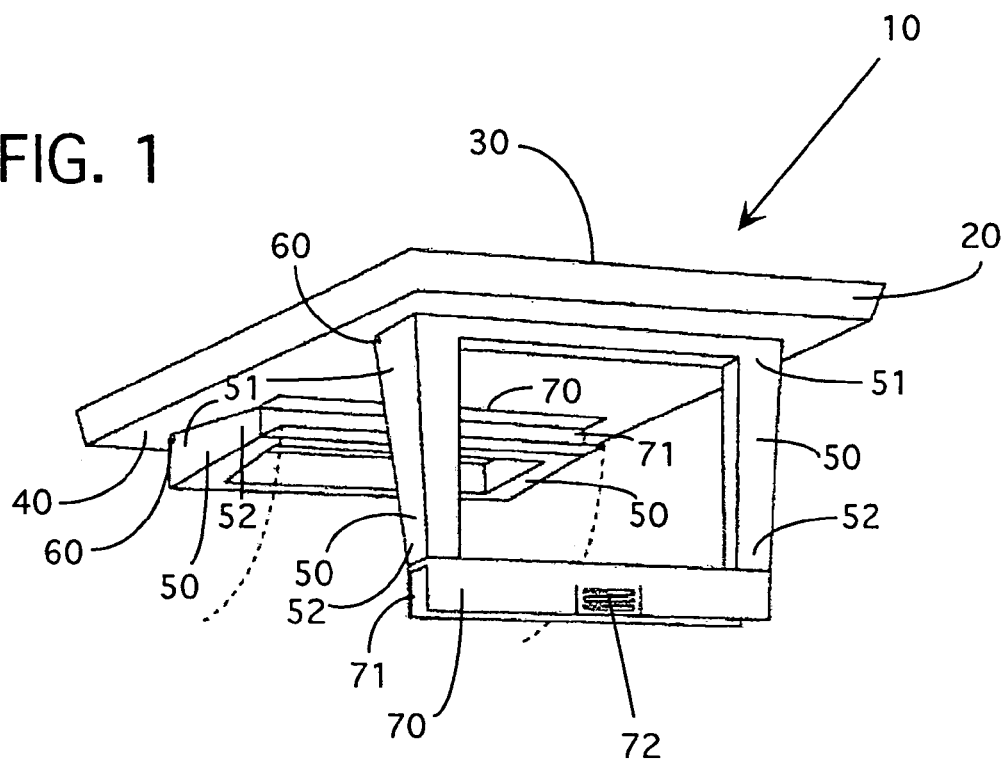
FIG. 1 is a perspective view of the work surface device, with one pair of legs in the open position and one pair of legs in the closed position.

Unless otherwise stated, all technical terms used herein have the same meaning as commonly understood by one of ordinary skill in the art to which this invention belongs. Generally, the nomenclature used herein is that well known and commonly employed in the art. All publications, including patent documents and articles, referred to in this application are incorporated by reference in their entirety for all purposes to the same extent as if each individual publication were individually incorporated by reference. All headings are for the convenience of the reader and should not be used to limit the meaning of the text that follows the heading, unless so specified.

Referring to FIGS. 1–12, where like numeral indicates like and corresponding elements, a work surface device 10 is provided for use in offices, workshops, kitchens, and the like. One aspect of the present invention is a table-like work surface device suitable for supporting objects above a waste container 80 while providing access to the interior of the waste container 80 for facilitating disposal of waste within the waste container 80 without disturbing the supported objects, the work surface device 10 comprising: a main body 20 having a substantially planar top comprising an upper manipulating surface 30 and a lower support surface 40, said main body 20 adapted for generally horizontal positioning; and at least one leg 50 having a first end 51 and a second end 52, said first end 51 fixably attached to and extending from said lower support surface 40 of said main body 20 for supporting said upper manipulating surface 30 above the waste container 80. The work surface device 10 and it's components can be made of a variety of materials, including, for example, plastic, rubber, metal, wood and glass.

In additional aspects of the present invention 10, the upper manipulating surface 30 has a plurality of apertures 73 formed therein to provide a means through which the user's fingers can be inserted from below so as to levitate trays 81 and 82, cutting board 83 or other objects resting on the planar top of the main body 20 so as to facilitate easy removal from the planar top of the main body 20.

In additional aspects of the present invention 10, the legs 50 are integral with the lower support surface 40. In certain aspects of the present invention, the legs 50 are pivotally connected to the lower support surface by a hinging means 60. In some aspects of the present invention, the hinging means 60 is a living hinge. Living hinges are thin sections of plastic that connect two segments of a part to keep them together and allow the part to be opened and closed. Typically living hinges are used in containers that are used in high volume applications such as toolboxes, fish tackle boxes, CD boxes etc. The materials used to make the living hinge are very flexible plastics such as polypropylene and polyethylene. The hinging means makes it possible to open the legs 50 for use of the device and to close the legs 50 for storage, by folding the legs 50 generally flat against the lower support surface 40. In certain aspects of the present invention, the legs 50 further comprise a locking means, such as those disclosed in U.S. Pat. No. 4,765,619 or U.S. Pat. No. 4,838,180, for holding said legs 50 at an angle such that the work surface device 50 can be placed on receptacles 80 of various shapes and sizes. In certain aspects of the present invention 10, the legs 50 are adjustable in length. In additional aspects of the present invention 10, the legs 50 are telescopingly adjustable and optionally fixable at predetermined distances, similar to those disclosed in U.S. Pat. No. 6,095,607.

Figure 2:
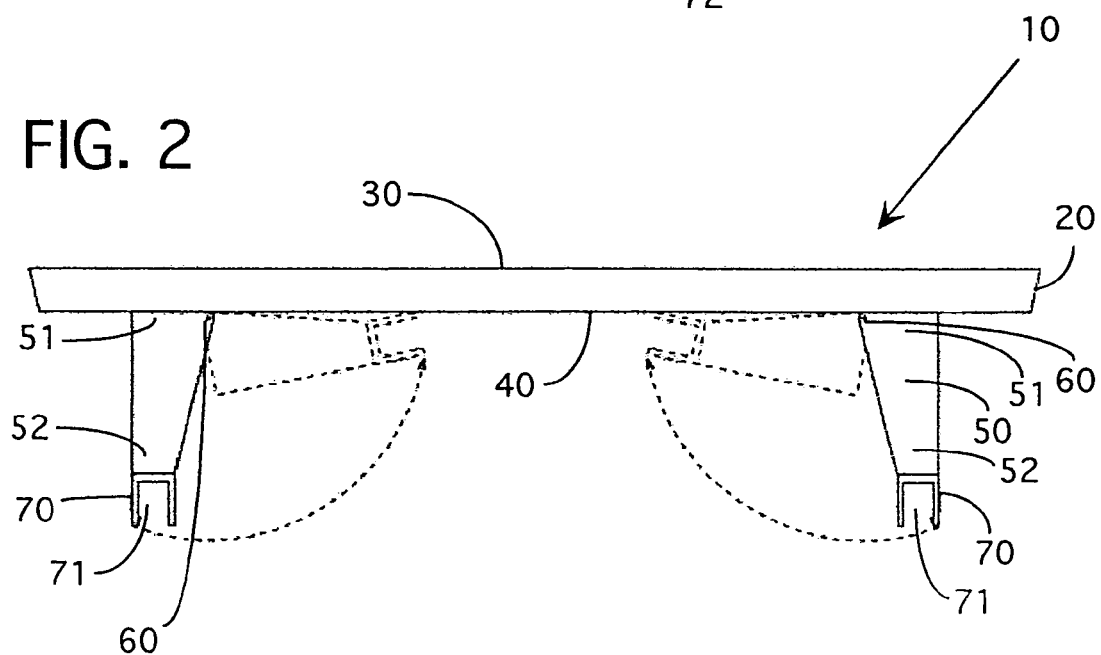
FIG. 2 is a side view of the work surface device of FIG. 1, illustrating the opening and closing of the legs.
Figure 3:
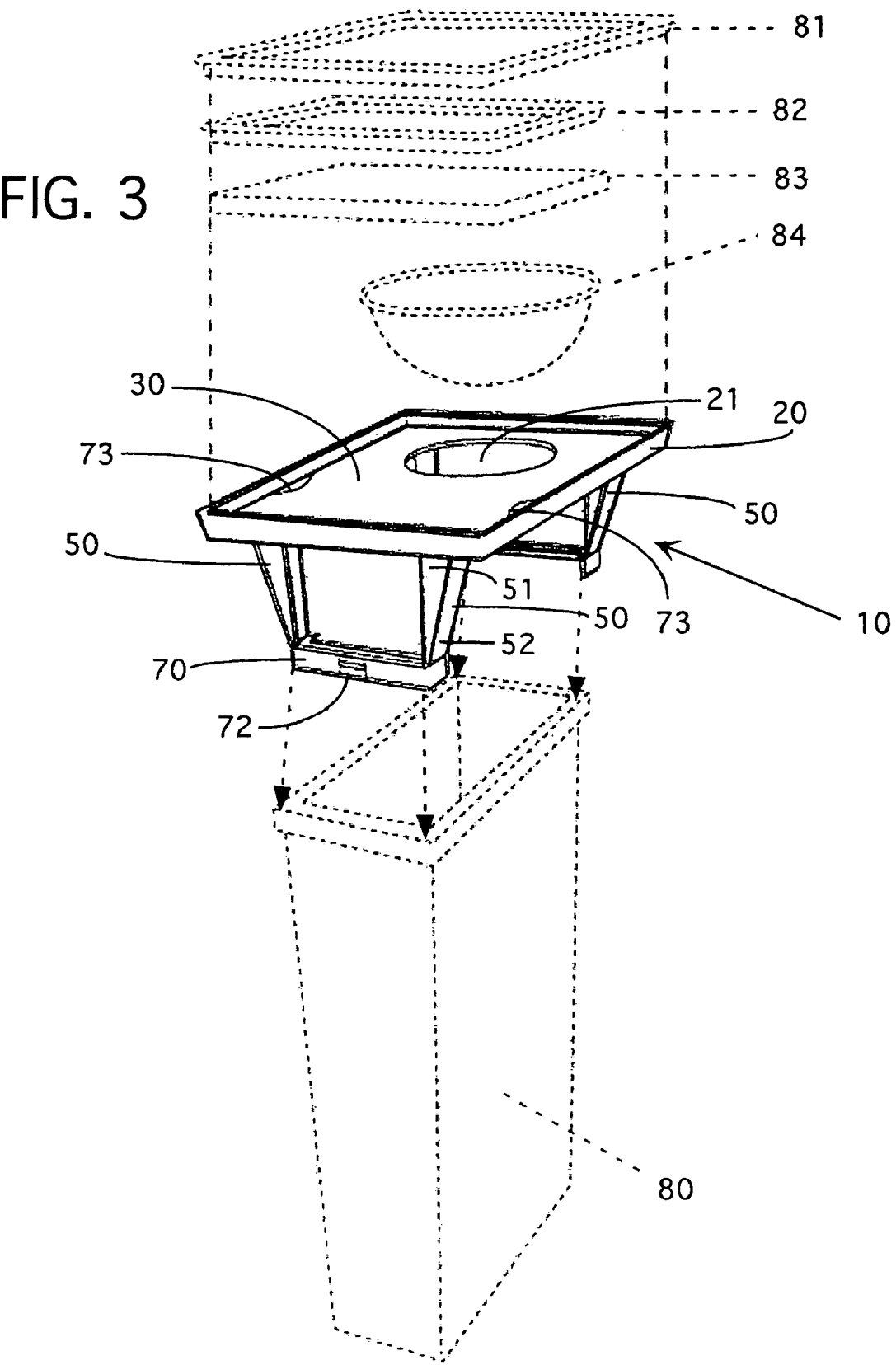
FIG. 3 is an open perspective view of the work surface device of FIG. 1, illustrating how the device attaches to the top of a rectangular receptacle and the accessory items that may be used with the device.
Figure 4:
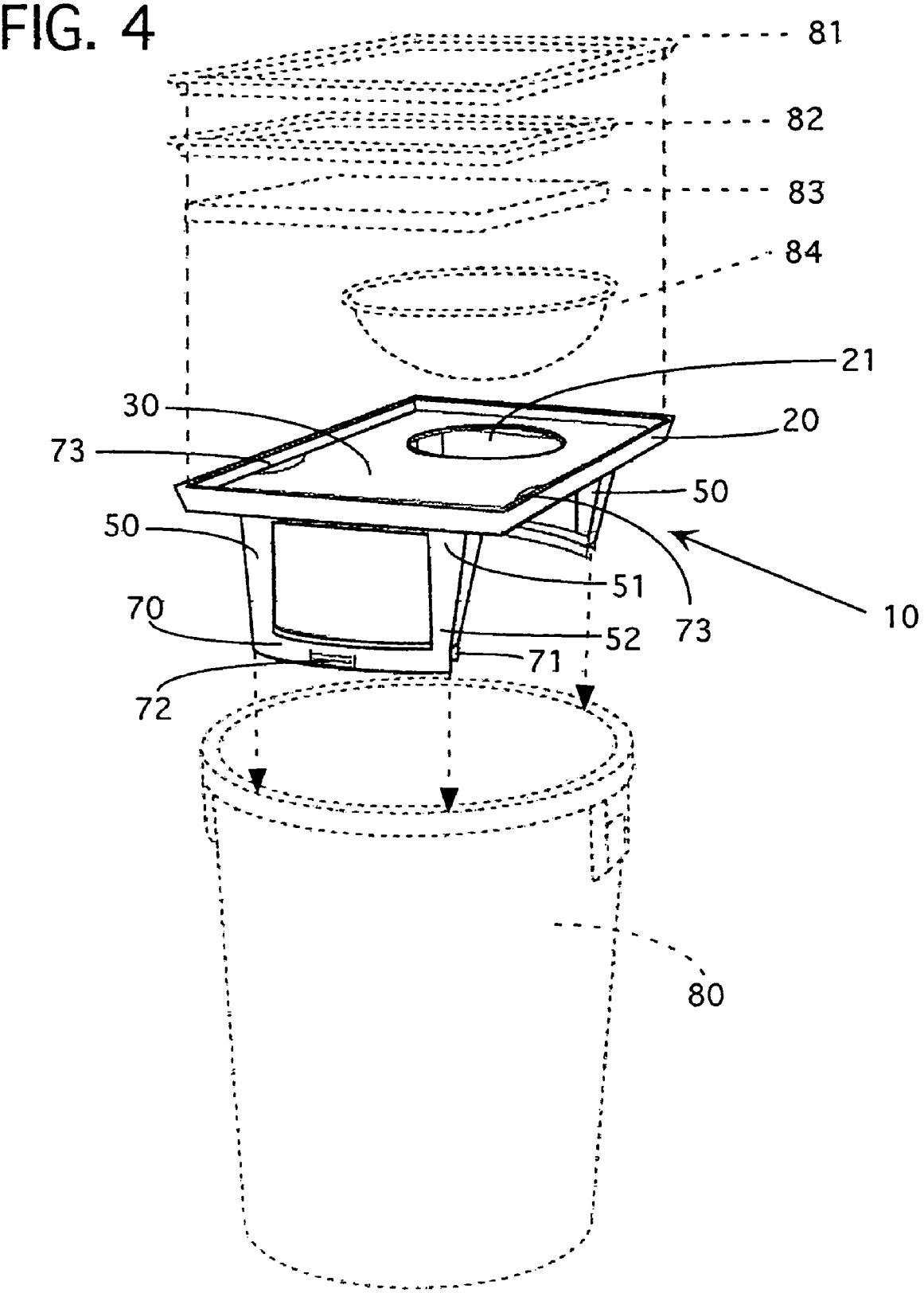
FIG. 4 is an open perspective view of a modified work surface device of FIG. 1, illustrating how the device attaches to the top of a circular receptacle and the accessory items that may be used with the device.
Figures 5, 6:
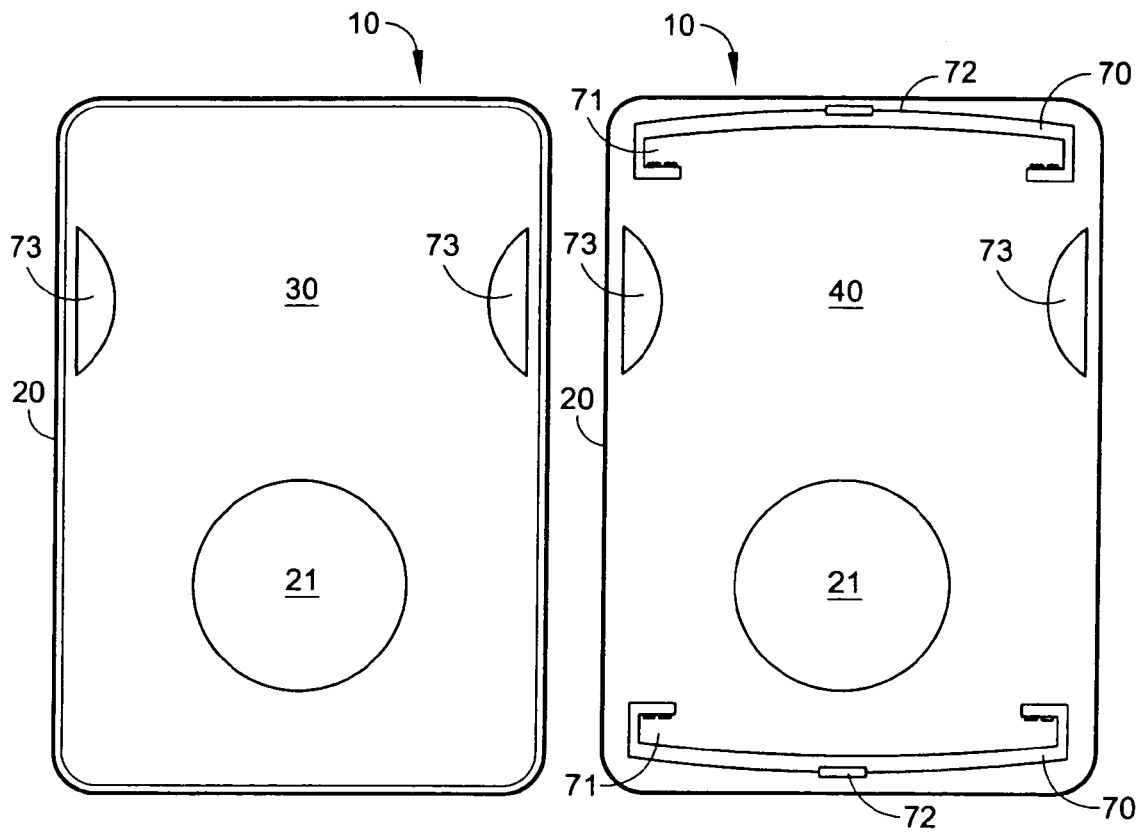
FIG. 5 is a top view of the modified work surface device of FIG. 4 showing the orifice.
FIG. 6 is a bottom view of the work surface device of FIG. 4 showing braces designed to fit on a rounded receptacle.
Figure 7:
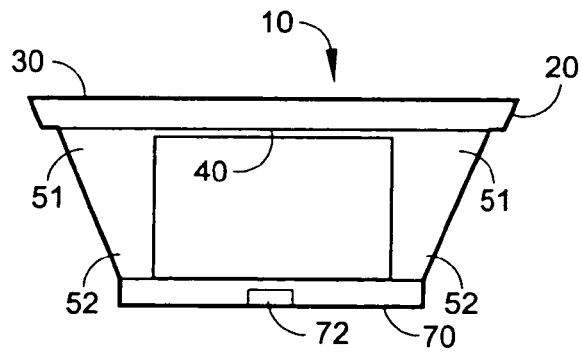
FIG. 7 is an end view of the work surface device of FIG. 4 showing braces designed to fit on a rounded receptacle showing braces designed to fit on a rounded receptacle.
Figure 8:
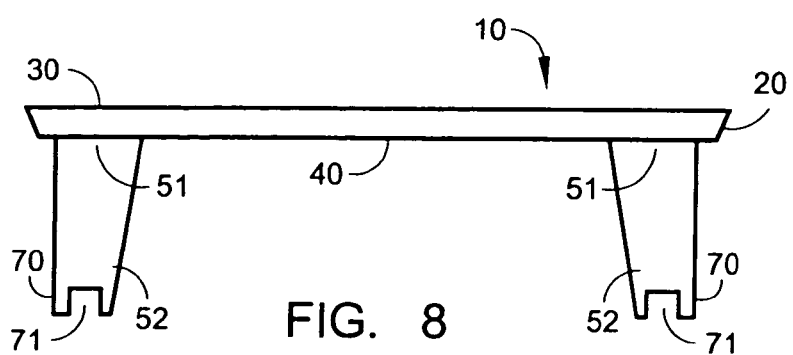
FIG. 8 is a side view of the work surface device of FIG. 4 showing braces designed to fit on a rounded receptacle.
Figures 9, 10:
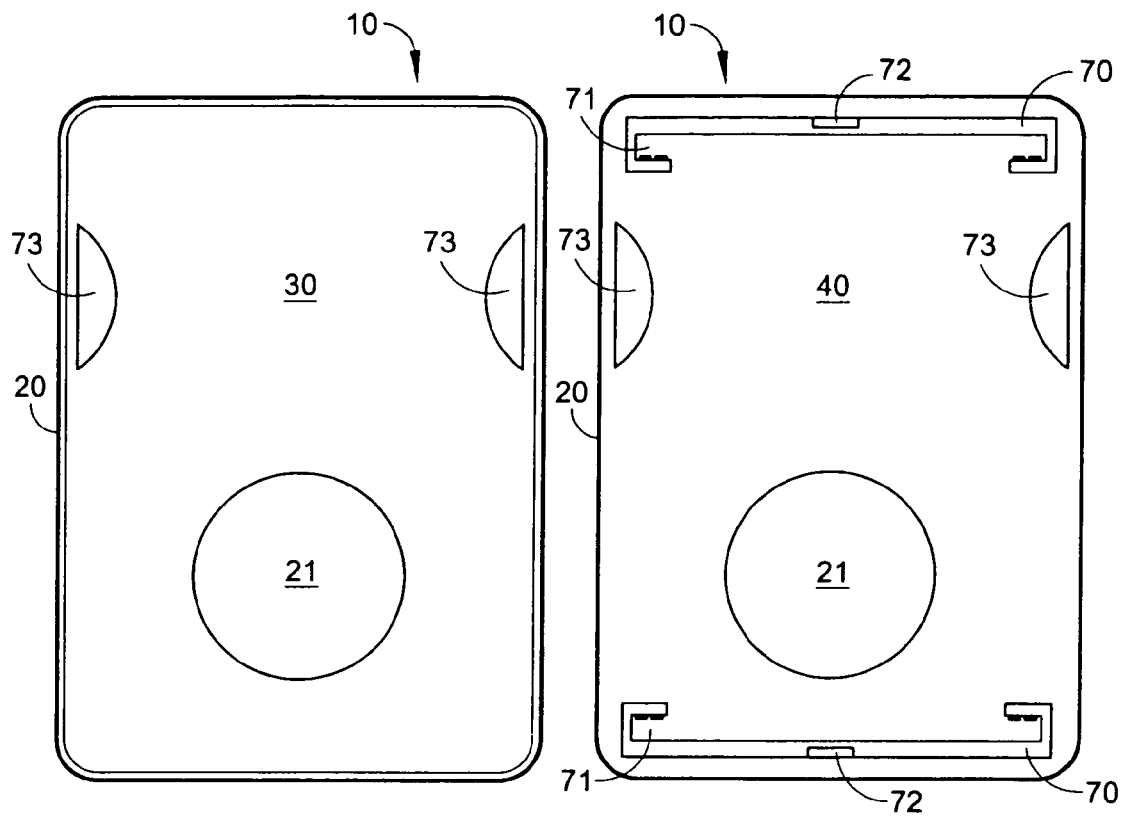
FIG. 9 is a top view of the work surface device of FIG. 1 showing the orifice.
FIG. 10 is a bottom view of the work surface device of FIG. 1 showing braces designed to fit on a rectangular receptacle.
Figure 11:
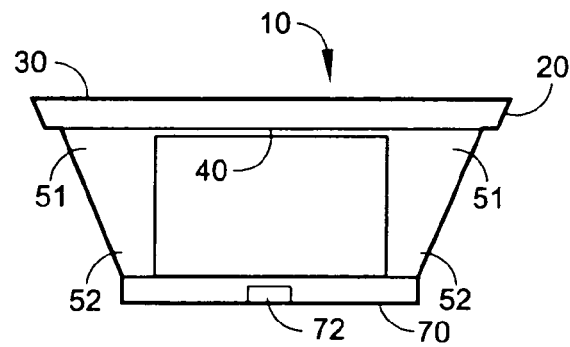
FIG. 11 is an end view of the work surface device of FIG. 1 showing braces designed to fit on a rectangular receptacle.
Figure 12:
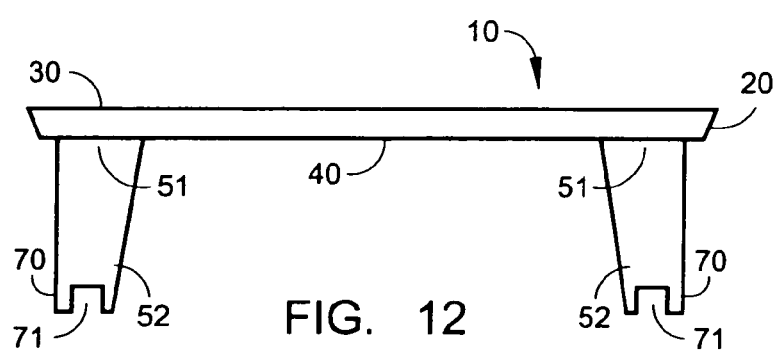
FIG. 12 is a side view of the work surface device of FIG. 1 showing braces designed to fit on a rectangular receptacle.

In another version of the present invention 10, a brace 70 is supportingly attached to two or more legs 50. The more than one brace 70 may be arrayed between two or more legs 50 from the first ends 51 of the legs 50 to the second ends 52 of the legs 50. Additionally, a single brace may be attached between two or more legs 50 at corresponding points at any distance from the lower support surface 40 between the first ends 51 and second ends 52 or at the second ends 52 of the two or more legs 50. In additional aspects of the present invention 10, the brace 70 further comprising a groove 71, facing away from the top of the device as shown in FIG. 1 and FIG. 2, for frictionally fitting said work surface device 10 onto the lip of the waste container 80. Alternatively, the present invention can be placed on a counter top. In certain aspects of the present invention, the leg 50 further comprises a rubber-like foot or patted structure fixably attached to said second end 52 of said at least one leg 50. The brace 70 is generally curved or generally straight so that the device 10 can fit onto various shapes of waste receptacles 80, FIG. 3 and FIG. 4. In further aspects of the present invention 10, the brace 70 also comprises a gripping region 72, by which the operator grasps the brace 70.

In certain additional aspects of the present invention 10, said planar top 20 has an aperture 21 formed therein for open-ended communication with the waste container 80 below as shown in FIG. 5, FIG. 6, FIG. 9 and FIG. 10. The aperture 21 may be of various shapes, such as circular, oval or rectangle. The aperture 21 may be of various sizes suitable for inserting and supporting commonly used utensils and containers. The aperture 21 may also be located in various places generally in the center of the top or generally near the edge of the top. Optionally, the planar top of the main body 20 is removably attached to said main body 20, providing a frame-like support structure with legs 50 that can be used to support trays 81 and 82, cutting boards 83, and the like. In preferred aspects of the present invention, the planar top 20 of the present invention 10 optionally comprises at least one full-length removable tray 81, at least one partial-length removable tray 82, at least one removable cutting board 83, at least one removable receptacle or container 84, or at least one removable sieving means 84. The removable trays 81 and 82, cutting board 83, container 84 and sieving means 84 may be made of commonly used materials, such as, for example, metal, plastic, glass and wood. The removable container may be of various common shapes, such as shallow and deep round bowls or shallow or deep oval bowls. The sieving 84 means may be of various shapes and designed to sieve or filter various materials. For example, the sieving means 84 might be a colander or grater, a chinoise or a cone filter.

In other aspects of the present invention 10, the main body 20 further comprises a plurality of panels movably attached in a flap-like manner to said main body 20 to cover the space defined by the manipulating surface 30, the at least one leg 50 and the waste container 80 while still permitting the disposal of waste into the waste container 80.

Another aspect of the present invention is a method of use of the work surface device 10 comprising the act of: placing said work surface device 10 on a receptacle 80.

A further aspect of the present invention is a method of holding objects above a receptacle 80 while facilitating disposal of waste into the receptacle 80 without disturbing the objects held above the receptacle 80, comprising: attaching a support structure 10 to the receptacle 80; placing objects on said support structure 10; and disposing of waste in the receptacle 80.

The present invention may be made using a variety of methods commonly used in the art. For example, if the present invention is made of plastic, the methods of plastic manufacturing available include, but are not limited to, injection molding, casting, laminating, extrusion and calendering. For example, the methods disclosed in U.S. Pat. No. 6,129,960, U.S. Pat. No. 4,548,773, or U.S. Pat. No. 5,451,363 might be used. Other methods may also be used. In addition, the present invention may be made of wood, metal, or glass, or a combination of plastic, wood, metal or glass.

EXAMPLES

Example 1:

Restaurants often have busy, crowded kitchens, with little extra counter space. The present invention satisfies several needs. Prepared food items can be placed on a sheet pan or in a container sitting on the present invention thus increasing valuable workspace in the kitchen. A cutting board can be placed on the apparatus and vegetables chopped and the waste swept through the aperture into the waste container below. Alternatively, a bowl can be placed in the aperture and the chopped vegetables on the cutting board transferred from the cutting board into the bowl, and then the bowl can be removed from the apparatus and transferred to another location in the kitchen, such as the stove. In another application, a chinoise can be placed in the aperture, a mixture placed in the chinoise, and the fluid pressed through the chinoise into the waste container below. The material remaining in the chinoise can then be used in another cooking process. In a further operation, the present invention can hold a tray, items, such as glasses, can be placed on the tray and then moved to another location by lifting the tray. The first tray can then be replaced with a second tray to be filled. In still another operation, the present invention can be used to hold boxes or the like while making the waste container available.

Example 2:

In offices and copy rooms, supplies are often stored in boxes in cabinets and shelves. However it is not uncommon for counter space to be taken up by supplies or another person's work. The present invention can be placed conveniently by a commonly used piece of machinery, such as a photocopier. This provides a place to put down documents being copied or small office supplies such as paper clips, staple removers, tape dispensers, and the like, while facilitating disposal of waste without disrupting the work placed on the device.

Example 3:

In machine shops, there is often a need for a convenient waste container but there is limited space. The present invention could be placed next to each machinist's work space. While providing a convenient waste disposal container, the present invention also provides a convenient place for holding tools and things such as nuts, bolts and screws. In addition, it is common in machine shops to wash mechanical components in solvents. The present invention provides a support for cleaning the components as well as convenient waste disposal directly below the work surface.

Example 4:

There are many methods of manufacturing that may be used to manufacture the present invention. For example, the present invention can be injection molded of plastic. In general, molds of the present invention are made. Then thermoplastic resins are heated until they form a thick liquid. The melted resins are injected into the mold. The heat and pressure are applied to the mold, which causes the injected melted resin to harden. After the hardening process, the present invention is removed from the mold and is now ready for use.

Example 5:

To use the present invention the operator removes the device from the place where the device has been stored. If the device was just purchased, the device is removed from its packaging. With one hand the operator holds the device by the edge of the planar top. With the other hand, the operator grasps one leg near its second end and pulls the leg, pivoting the leg down and away from the lower support surface of the planar top of the device, until the leg is in the position open position FIG. 2. The remaining legs are opened from the flat, closed position to the open position, as described for the first leg. With the legs of the device open, the device is placed on top of an open receptacle. To do this, the second ends of the legs are attached to the lip of the receptacle. The device may then be used to work or to hold objects. To clean and store the present invention the operator disengages the device from the top of the open receptacle, grasps each leg sequentially near its second end and pull the legs, pivoting the leg up and into the lower support surface of the planar top of the device. With both legs in an upright position, the device can be cleaned by a common dish washing machine and then easily stored in a stacked position on a shelf.

What is claimed is:

1. A method of supporting objects above a waste container having an upper lip while providing access to an interior of the waste container for facilitating disposal of waste within the waste container without disturbing the supported objects, comprising:

providing a work surface device including a) a substantially planar main body having an upper manipulating surface and a lower support surface, said main body adapted for generally horizontal positioning; and b) at least one leg pivotally connected to said lower support surface by a hinging means, and having a first end and a second end, said first end attached to and extending from said lower support surface of said main body for supporting said upper manipulating surface above the waste container;

placing the work surface device on the waste container by connecting the second end of said at least one leg to the upper lip of the waste container, whereby objects are supported above the waste container by the work surface device while providing access to an interior of the waste container for facilitating disposal of waste within the waste container without disturbing the supported objects.

2. A method of supporting objects above a waste container having an upper lip while providing access to an interior of the waste container for facilitating disposal of waste within the waste container without disturbing the supported objects, comprising:

providing a work surface device including a) a substantially planar main body having an upper manipulating surface and a lower support surface, said main body adapted for generally horizontal positioning; and b) at least one leg having a first end and a second end, said first end attached to and extending from said lower support surface of said main body for supporting said upper manipulating surface above the waste container, said at least-one leg including two or more legs, and further including a brace supportingly attached to said two or more legs;

placing the work surface device on the waste container by connecting the second end of said at least one leg to the upper lip of the waste container, whereby objects are supported above the waste container by the work surface device while providing access to an interior of the waste container for facilitating disposal of waste within the waste container without disturbing the supported objects.

3. The method of claim 2, wherein said brace includes a groove for frictionally fitting said work surface device onto the waste container.

4. A method of supporting objects above a waste container having an upper lip while providing access to an interior of the waste container for facilitating disposal of waste within the waste container without disturbing the supported objects, comprising:

providing a work surface device including a) a substantially planar main body having an upper manipulating surface and a lower support surface, said main body adapted for generally horizontal positioning, wherein said main body has an aperture formed therein for open-ended communication with the waste container below; and b) at least one leg having a first end and a second end, said first end attached to and extending from said lower support surface of said main body for supporting said upper manipulating surface above the waste container;

placing the work surface device on the waste container by connecting the second end of said at least one leg to the upper lip of the waste container, whereby objects are supported above the waste container by the work surface device while providing access to an interior of the waste container for facilitating disposal of waste within the waste container without disturbing the supported objects.

5. A method of supporting objects above a waste container having an upper lip while providing access to an interior of the waste container for facilitating disposal of waste within the waste container without disturbing the supported objects, comprising:

providing a work surface device including a) a main body with a planar top removably attached to said main body, an upper manipulating surface, and a lower support surface, said main body adapted for generally horizontal positioning; and b) at least one leg having a first end and a second end, said first end attached to and extending from said lower support surface of said main body for supporting said upper manipulating surface above the waste container;

placing the work surface device on the waste container by connecting the second end of said at least one leg to the upper lip of the waste container, whereby objects are supported above the waste container by the work surface device while providing access to an interior of the waste container for facilitating disposal of waste within the waste container without disturbing the supported objects.

6. The method of claim 5, wherein said planar top comprises at least one partial-length removable tray.

7. The method of claim 5, wherein said planar top comprises at least one removable cutting board.

8. The method of claim 5, wherein said planar top comprises at least one removable receptacle.

9. The method of claim 5, wherein said planar top comprises at least one removable sieving means.

10. A method of using a work surface device with a receptacle, comprising:

providing a work surface device including a) a table defining an upper side and an underside and a frame, said upper side of said table defining a working surface, said table having an orifice therein for open-ended communication with the underlying receptacle; and b) a plurality of support members each having a height, a first end and a second end and being attached in endwise manner at said first end to said frame of said table and projecting away from said underside of said table;

placing the work surface device on the receptacle by connecting the second ends of said plurality of support members to the receptacle so that the table is a distance above a top of the receptacle by a distance substantially equal to the height of the support members.

11. A method of holding objects above a receptacle while facilitating disposal of waste into the receptacle without disturbing the objects held above the receptacle, comprising:

a) providing a support structure, the support structure including an orifice therein for open-ended communication with the underlying receptacle;

b) attaching the support structure to the receptacle, above the receptacle so as to create an opening between a top of the receptacle and a bottom of the support structure so that waste is disposable in the receptacle through the opening;

c) placing objects on said support structure; and d) disposing of waste on the support structure through the orifice of the support structure and into the underlying receptacle.

12. The method of claim 11, wherein the support structure is substantially rectangular.

13. The method of claim 11, wherein the receptacle is a receptacle including an upper lip defining a round opening or a receptacle including an upper lip defining a rectangular opening, and the support structure includes support members configured to attach to the upper lip of the receptacle with the round opening or the upper lip of the receptacle with the rectangular opening.

14. The method of claim 11, further including a plurality of support members each having a first end and a second end and being attached in endwise manner at said first end to said support structure and projecting away from an underside of said support structure, and further including locking mechanisms for the support members.

15. The method of claim 11, wherein the receptacle includes a top opening, and the support structure has a size that is substantially the same as the top opening.

* * * * *